United States Patent [19]
Wang et al.

[11] Patent Number: 5,307,268
[45] Date of Patent: Apr. 26, 1994

[54] METHOD FOR USING P-S CONVERTED WAVES AS A SUBSALT IMAGING TOOL

[75] Inventors: Shein S. Wang; David W. Bell; Stephen J. Hill; Gregory L. Loumos, all of Ponca City, Okla.

[73] Assignee: Conoco Inc., Ponca City, Okla.

[21] Appl. No.: 711,823

[22] Filed: Jun. 7, 1991

[51] Int. Cl.[5] ............................................. G01V 1/36
[52] U.S. Cl. ....................................... 364/420; 367/53
[58] Field of Search ................................ 364/420-422; 367/53

*Primary Examiner*—Gail O. Hayes
*Attorney, Agent, or Firm*—M. Kathryn Braquet Tsirigotis

[57] ABSTRACT

A hybrid velocity model is used to image the subsalt reflector. A method for imaging subsalt reflectors includes receiving seismic data and depth migrating the raw data. Generated seismic P-waves are assigned a first P-wave velocity for travel outside a salt wedge. Prior to entering the salt wedge, the wave is treated as a compressional wave. Upon entering the salt wedge, the P-wave is treated as a converted S-wave and a corresponding S-wave velocity is assigned to the converted wave. When the converted S-wave exits the salt wedge, it is again converted, this time back to a P-wave. As this wave travels through the subsalt layer to a reflector interface, it is assigned a P-wave velocity. Thus, a velocity model which includes both P-wave and S-wave velocities is used to image reflectors below salt wedges.

14 Claims, 3 Drawing Sheets

METHOD FOR USING P-S CONVERTED WAVES AS A SUBSALT IMAGING TOOL

BACKGROUND OF THE INVENTION

1. Field of the Invention

The present invention pertains to seismic data processing and more particularly to data processing where converted shear waves are used in a hybrid velocity model to image reflectors located below salt wedges.

2. Related Prior Art

Seismic data is used to obtain images of subsurface formations by generating seismic waves, transmitting them into the earth to a reflector or change in density interface and detecting their arrival at a receiver. This data is in the form of time maps (e.g. seismic section, seismic trace, seismic sample, and the like) which are arranged according to time durations. The known factors are the source location, the receiver location and the time duration from generation to detection. The velocity of the seismic waves may be approximated by any one of the many methods presently in use. From these known quantities, the depth of the reflector is approximated by depth migration. Depth migration is the mapping of seismic traces on a depth scale, that is, migrating data from time to depth. This may be done either before or after mid point or common depth point (CDP) data is stacked or combined. One method for locating or identifying reflectors is by ray tracing from one point, such as the source location, to the reflector and back to a second point, such as a receiver location. Ray tracing in this manner is becoming extremely popular with the advent of high speed digital computers. However, two point ray tracing, from a source and back to a receiver, requires travel times for ray paths connecting a source position, all image points and a receiver position. This type of ray tracing requires that individual travel times be determined for each ray path from a source, to an image point and to a receiver for each image point at which the seismic wave generated at this source could be reflected and be detected at this receiver. Typically there are many hundreds of thousands of such image points. Thus, two point ray tracing is very time consuming and prohibitively expensive for computing the required travel times.

Current seismic processing images p-wave reflection energy. For salt wedges with its base dipping at greater than critical angle, the reflection from a subsalt reflector becomes a refracted wave as it enters the salt, preventing the subsalt reflector from being imaged. Converted waves enter the salt with less restriction. Therefore, prestack depth migration can be better used to analyze converted waves to form subsalt images.

SUMMARY OF THE INVENTION

The present invention provides a method for imaging subsalt reflectors. Current seismic processing images p-wave reflection energy. For salt wedges with its base dipping at greater than critical angle, the reflection from subsalt reflectors becomes a refracted wave as it enters the salt, preventing the subsalt reflector from being imaged. A converted wave enters the salt with less restriction, therefore, prestack depth migration can be used to analyze converted waves to form subsalt images. In the method of the present invention, a p-wave velocity is assigned to a generated p-wave outside the salt wedge. Through the salt wedge, a p-wave velocity is selected for the wave traveling through the salt wedge to image the salt bottom. A p-wave velocity is selected for the travel of the converted wave below the salt wedge by changing the velocity for the wave traveling through the salt wedge to an s-wave velocity. A hybrid velocity model, using p-wave velocities outside the salt and s-wave velocities within the salt, is produced. Thus, a hybrid velocity model is used to accurately image subsalt reflectors (when the subsalt reflections are recorded on converted waves).

DESCRIPTION OF THE PREFERRED EMBODIMENT

The present invention provides a method for imaging subsalt reflectors. Current seismic processing images p-wave reflection energy. For salt wedges with bases dipping at greater than critical angle, the reflection from subsalt reflectors becomes a refracted wave as it enters the salt, preventing the subsalt reflector from being imaged. A converted wave enters the salt with less restriction, therefore, prestack depth migration can be used to analyze converted waves to form subsalt images. In the method of the present invention, a p-wave velocity is used to image p-wave events outside the salt wedge. (Through the base of the salt wedge, an s-wave velocity is assigned to the converted wave). Thus, a hybrid velocity model is used to accurately image subsalt reflectors. The method for imaging subsalt reflectors includes receiving seismic data and depth migrating the raw data. Generated seismic p-waves are assigned a first p-wave velocity for travel outside a salt wedge. Prior to entering the salt wedge, the wave is a compressional wave. Upon entering the salt wedge, the p-wave is converted to an s-wave and a corresponding s-wave velocity is assigned to the converted wave. When the converted s-wave exits the salt wedge, it is again converted, this time back to a p-wave. As this wave travels through the subsalt layer to a reflector interface, it is assigned a p-wave velocity. Thus, a velocity model which includes both p-wave and s-wave velocities is used to image reflectors below salt wedges.

Figure 1:
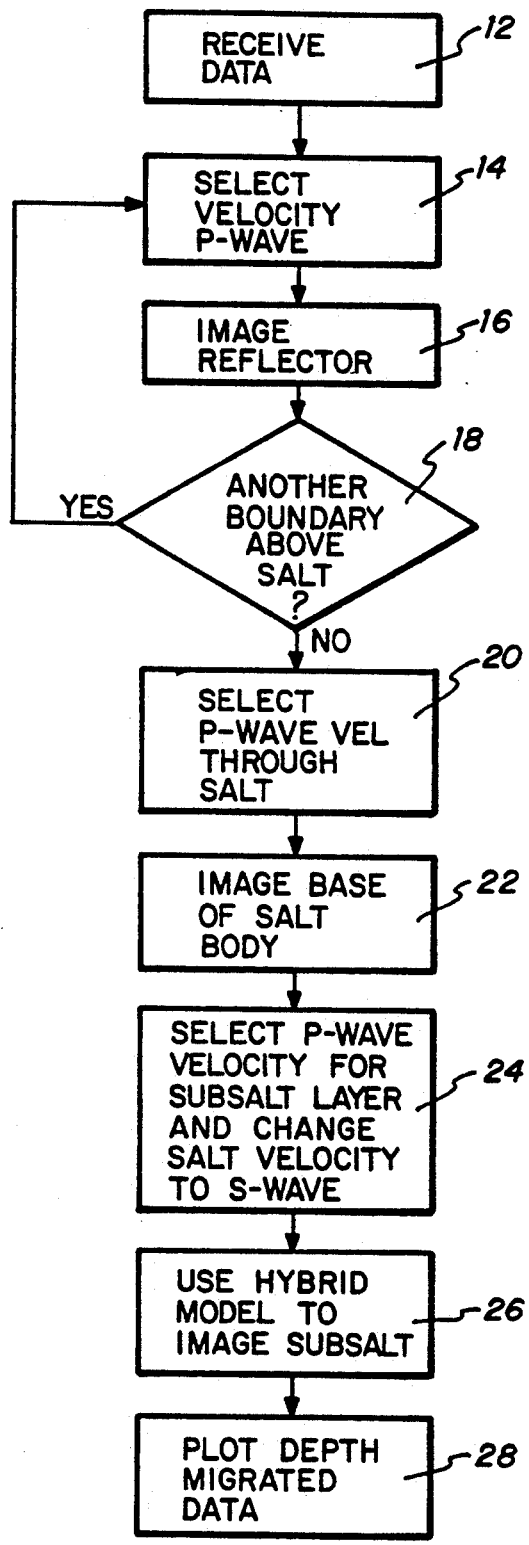
FIG. 1 is a block diagram of a method for imaging subsalt reflectors using a hybrid velocity model.

Referring now to FIG. 1, a block diagram of the method of the present invention is illustrated. At block 12 data is received. This data may be of any form that is currently in use in the area of seismic data processing. With this data the approximate location of a salt wedge is determined.

At block 14 a compressional wave velocity is elected for p-waves traveling to the next lower interface.

At block 16 the first velocity selected is used to image the next lower interface. This velocity is the velocity of a compression or p-type wave through the first layer or the layer above the salt wedge.

At block 18 a determination is made as to whether additional layers exist above the salt wedge. The data may be plotted in time prior to migration to obtain a general presentation of the area surveyed. This also may be done using depth migration directly, eliminating the need for a time plot of the data prior to migration. If there are several layers above the salt wedge the velocities for each layer, using velocities of compression waves, are selected at this time. The velocity selected is a p-type or compression wave type velocity which is greater than an s-type or shear wave type velocity. For example, the velocity of a compression wave in the layer above the salt wedge might be seven thousand feet per second while the velocity of a shear wave might be only four thousand forty-two feet per second. If there are additional layers, the program returns to block 14 where a second or additional velocity is selected. If there are no additional layers, the program proceeds to block 20 where a p-type velocity is selected for travel through the salt wedge.

At block 22 the base of the salt wedge is imaged using the p-type or compressional wave velocity. At block 24 a p-wave velocity is selected for the seismic wave traveling through the subsalt layer. At this time, the p-wave velocity selected for the wave as it travels through the salt wedge is changed to a s-type velocity. The purpose of selecting a velocity of the slower moving s-type seismic waves is that the original p-type seismic wave has been converted to an s-type wave at the interface between the layer preceding the salt wedge and the salt wedge. As a result, the seismic wave travels at a slower speed through the salt. The difference between the velocities of compression and shear waves in the salt wedge are significant. A compression wave might travel at fifteen thousand feet per second and the shear wave at only eight thousand six hundred feet per second. One tenth of a second difference in arrival time can mean the difference of seven hundred feet in depth. If this change in velocity is not allowed for, the image of the reflector or reflectors below the salt wedge will appear at a deeper depth than they occur in reality, greatly distorting the depth of these reflectors.

At block 26 the hybrid model, using p-wave velocities for layers above the salt wedge, s-wave velocities through the salt wedge and p-wave velocities below the salt wedge, is used to image subsalt reflectors.

The layers below the salt wedge are p-type velocities. These are also velocities of the faster traveling p-type compressional waves. When the s-type wave is incident on the interface between the salt bottom and the next lower layer, the wave is again converted, at least the wave that will be detected by a geophone or other seismic receiver. That is, the wave of interest will be converted from an s-type wave to a p-type wave. Therefore, a p-type wave velocity is selected. For this layer a velocity of, for example, eight thousand feet per second might be used instead of a shear velocity of four thousand six hundred feet per second.

Finally, a migrated plot of the subsurface reflectors may be provided at block 28. This plot includes an improved and more accurate depth location of subsalt reflectors.

FIGS. 2, 3, 4, 6 and 7 illustrate velocity models having a first layer $L_1$ above a salt wedge with interfaces $I_1$ and $I_2$ and a reflector $R_1$.

Figure 2:
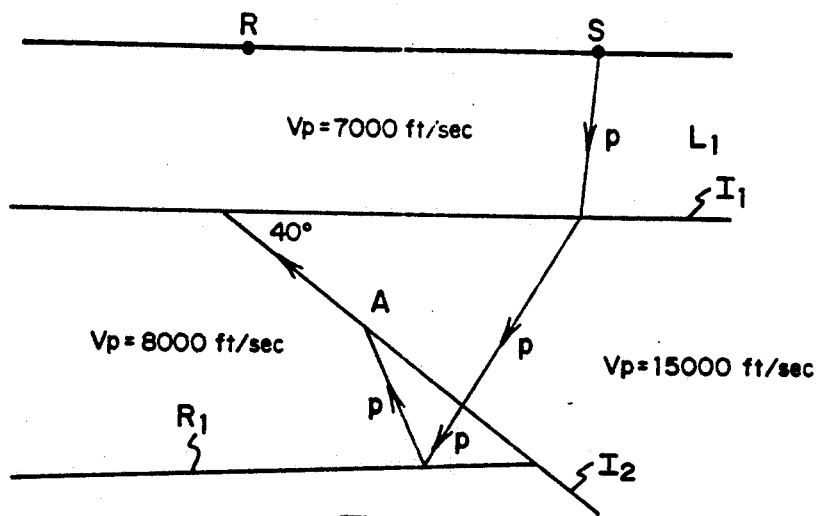
FIG. 2 illustrates a p-wave subsalt reflection which exceeds the critical angle.

FIG. 2 shows a sub-salt p-wave reflection, which exceeds the critical angle at point A on the bottom of salt wedge and turns into a refraction. The energy generated by source S will not be received at the surface by receiver R. Using p-type velocities for waves detected by the seismic receivers such as those for the waves illustrated will be inaccurate since waves that travel at these velocities are not detected.

Figure 3:
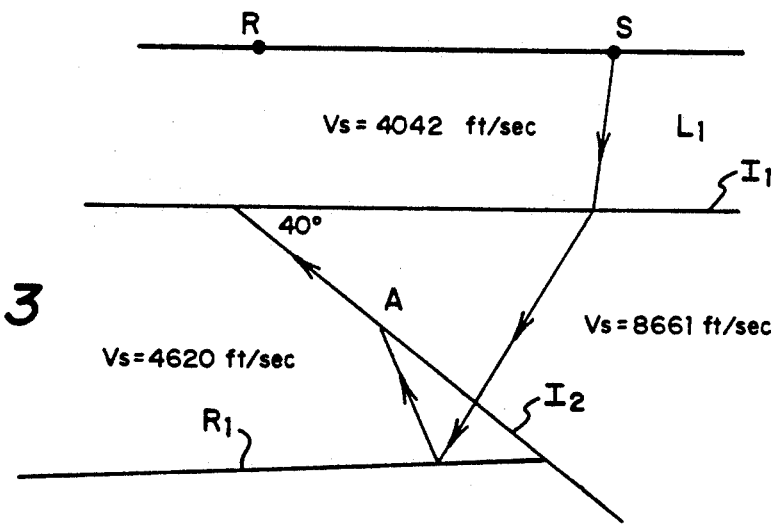
FIG. 3 illustrates an s-wave subsalt reflection which exceeds the critical angle.

FIG. 3 shows a sub-salt s-wave reflection, which exceeds the critical angle at point A and turns into a refraction. This energy generated by source S also will not be received at the surface by receiver R. Using s-type velocities for waves detected by the seismic receivers such as those for the waves illustrated in this Figure will be inaccurate since waves that travel at these velocities are not detected.

Figure 4:
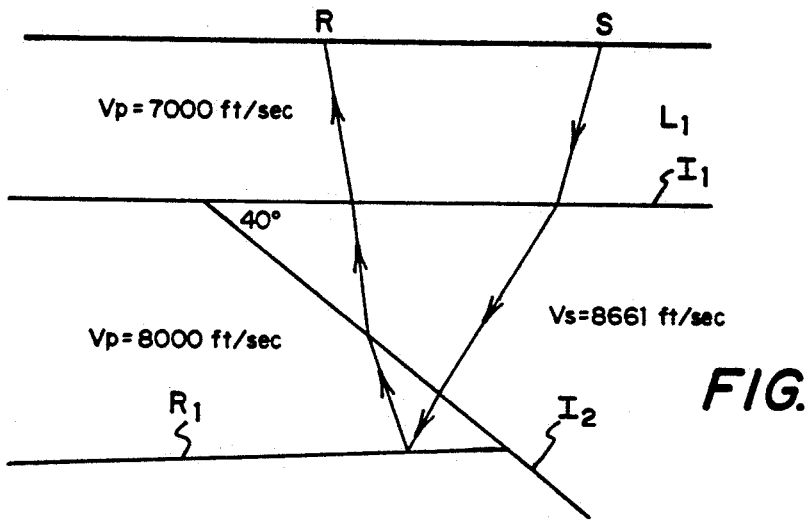
FIG. 4 illustrates a converted wave, which as a p-wave outside salt and a s-wave inside salt, is recorded.

FIG. 4 shows a converted wave travel path. The initial p-wave is changed into a s-wave at top of salt, goes through salt as a s-wave and changed into a p-wave as it passes through the base of salt. Since it goes through salt as a s-wave, it is not critical coming back up through salt. This energy will be recorded.

Figure 5:
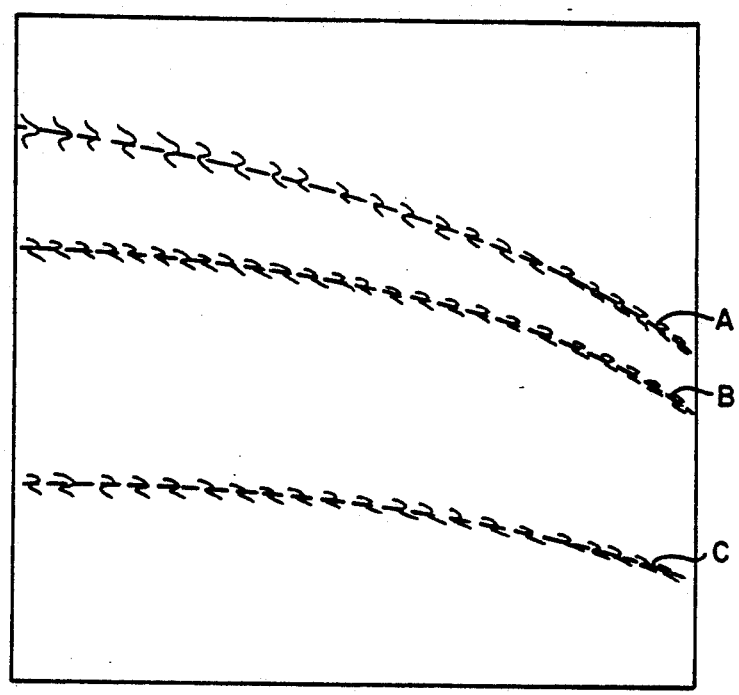
FIG. 5 illustrates a typical shot profile which recorded p-wave reflections A, B and converted wave reflection C from a subsalt reflection.

FIG. 5 show a typical shot profile, which records the p-p top of salt reflection A (interface $I_1$) and the p-p base of salt reflection B (interface $I_2$). In addition it shows a p-s-p converted wave sub-salt reflection C (reflector $R_1$).

Figure 6:
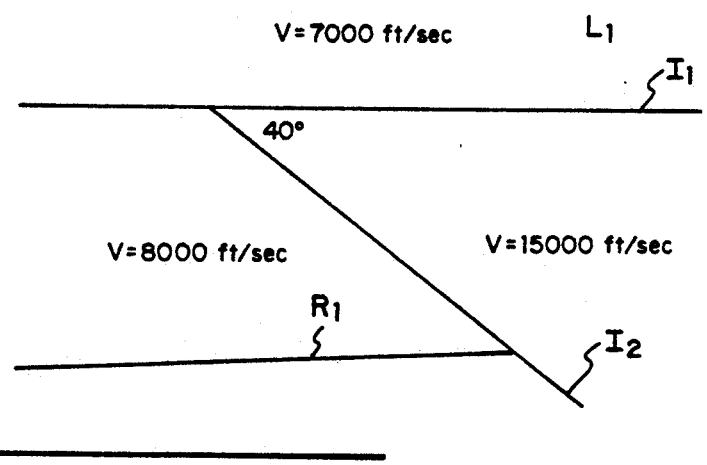
FIG. 6 illustrates a velocity model used to depth migrate p-wave reflections A and B.

FIG. 6 shows a p-wave velocity model. This model will be used to depth migrate the recorded shot profiles so that event A and B are imaged.

Figure 7:
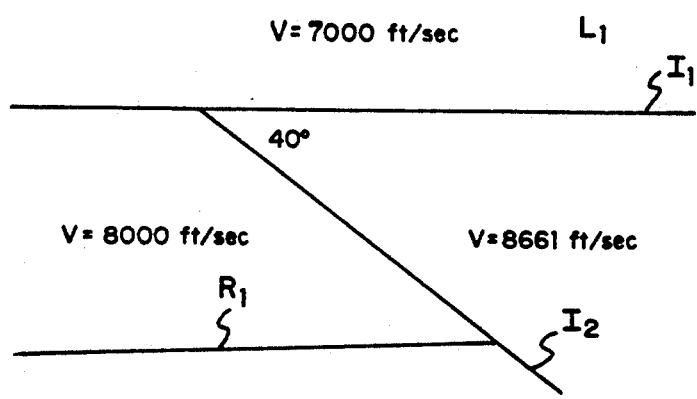
FIG. 7 illustrates a velocity model used to depth migrate converted wave subsalt event C.

FIG. 7 shows a velocity model used to image event C. This model is identical to the one shown in FIG. 6 except that s-wave velocity for salt is used inside the salt layer. The two depth sections, one carries the images A and B and the other carries the subsalt image C, will then be added to give the final section, which has all three images.

The present invention provides a method for imaging subsalt reflectors, which has proven to be an extremely difficult task using the methods of prior art. The method of the present invention uses a hybrid velocity model to account for the wave conversion that takes place at the interfaces between a salt wedge and exterior layers. P-type velocities are used for wave travel outside the salt wedge while s-type velocities are used for wave travel within the salt wedge.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A method for imaging reflectors located below a salt wedge comprising the steps of:
   receiving original seismic data in time;
   determining salt wedge interfaces;
   selecting a first velocity of a p-type wave through the layer above the salt wedge;
   selecting a second velocity of a p-type seismic wave that is traveling through the salt wedge;
   imaging the base of the salt wedge;
   changing said second velocity of a p-type seismic wave to a third velocity of an s-type seismic wave;
   selecting a fourth velocity for layers below the salt wedge, said fourth velocity of a p-type wave;

using said first velocity in a velocity model used to depth migrate the original data;

using said third velocity selected to determine the true depth of the salt bottom;

using said fourth velocity to determine the depth of the subsalt reflector; and plotting the depth location of the salt wedge and said subsalt reflector.

2. The method according to claim 1 wherein said determining step includes the step of:

plotting said data in time prior to migration to receive a general presentation of the area surveyed.

3. The method according to claim 1 wherein said determining step includes the step of:

obtaining the approximate location of the salt wedge.

4. The method according to claim 1 wherein said step of selecting a first velocity includes the step of:

choosing additional velocities for all layers above the salt wedge.

5. The method according to claim 1 wherein said step of selecting a third velocity includes the step of:

choosing additional velocities for all layers below the salt bottom.

6. An apparatus for imaging reflectors located below a salt wedge comprising:

receiving means for receiving original seismic data in time;

determining means for determining salt wedge interfaces;

means for selecting a first velocity of a p-type wave through the layer above the salt wedge;

means for selecting a second velocity of a p-type seismic wave that is traveling through the salt wedge;

means for imaging the base of the salt wedge;

means for changing said second velocity of a p-type seismic wave to a third velocity of an s-type seismic wave;

means for selecting a fourth velocity for layers below the salt wedge, said fourth velocity of a p-type wave;

means for using said first velocity in a velocity model used to depth migrate the original data;

means for using said third velocity selected to determine the true depth of the salt bottom;

means for using said fourth velocity to determine the depth of the subsalt reflector; and means plotting the depth location of the salt wedge and said subsalt reflector.

7. The apparatus according to claim 6 wherein said determining means includes:

means for plotting said data in time prior to migration to receive a general presentation of the area surveyed.

8. The apparatus according to claim 6 wherein said determining means includes:

means for directly obtaining the approximate location of the salt wedge.

9. The apparatus according to claim 6 wherein said means for selecting a first velocity includes:

means for choosing velocities for all layers above the salt wedge.

10. The apparatus according to claim 6 wherein said means for selecting a fourth velocity includes:

means for choosing velocities for all layers below the salt wedge bottom.

11. A method for imaging reflectors located below a salt wedge comprising the steps of:

receiving original seismic data in time;

determining salt wedge interfaces;

selecting a first velocity of a p-type wave through the layer above the salt wedge, a second velocity of an s-type seismic wave that is traveling through the salt wedge and a third velocity for layers below the salt wedge, said third velocity of a p-type wave;

using said first velocity in a velocity model used to depth migrate the original data to determine the depth of the salt wedge, said second velocity selected to determine the depth of the salt bottom and said third velocity to determine the depth of the subsalt reflector; and plotting the depth location of the salt wedge and said subsalt reflector.

12. The method according to claim 11 wherein said determining step includes the step of:

plotting said data in time prior to migration to receive a general presentation of the area surveyed.

13. The method according to claim 11 wherein said determining step includes the step of:

obtaining the approximate location of the salt wedge.

14. The method according to claim 11 wherein said step of selecting a first velocity, a second velocity and a third velocity includes the steps of:

choosing velocities for all layers above the top of the salt wedge; and choosing velocities for all layers below the salt wedge bottom.

* * * * *